United States Patent
Vangbo (12)

(10) Patent No.: US 6,375,914 B1
(45) Date of Patent: Apr. 23, 2002

(54) METHOD FOR TREATING SILICA GEL

(75) Inventor: Hakan Vangbo, Jarfalla (SE)

(73) Assignee: AB Carl Munters, Sollentuna (SE)

( * ) Notice: Subject to any disclaimer, the term of this patent is extended or adjusted under 35 U.S.C. 154(b) by 0 days.

(21) Appl. No.: 09/509,345

(22) PCT Filed: Oct. 14, 1998

(86) PCT No.: PCT/SE98/01849

§ 371 Date: Mar. 27, 2000

§ 102(e) Date: Mar. 27, 2000

(87) PCT Pub. No.: WO99/20564

PCT Pub. Date: Apr. 29, 1999

(30) Foreign Application Priority Data

Oct. 16, 1997 (SE) .............................................. 9703772

(51) Int. Cl.$^7$ ............................................ C01B 33/157
(52) U.S. Cl. ........................ 423/338; 423/335; 423/266
(58) Field of Search ................................ 423/335, 338, 423/265, 266

(56) References Cited

U.S. PATENT DOCUMENTS

| 2,551,014 A | * | 5/1951 | Kimberlin, Jr. et al. | ........ 502/8 |
| 3,216,922 A | * | 11/1965 | O'Hara | ........................ 208/211 |
| 4,595,578 A | | 6/1986 | Cohen et al. | ................ 423/338 |
| 6,165,351 A | * | 12/2000 | Laine et al. | ................. 208/118 |

FOREIGN PATENT DOCUMENTS

GB          1265550          3/1982

OTHER PUBLICATIONS

Derwent's Abstract of No. 92–393131/48, week 9248, Abstract of JP, 4290546 (Kuraray Chem Co Ltd), Oct. 15, 1992.

* cited by examiner

Primary Examiner—Ngoc-Yen Nguyen
(74) Attorney, Agent, or Firm—Dowell & Dowell, P.C.

(57) ABSTRACT

A method for stabilizing silica gel wherein after the gel is precipitated it is treated in a solution consisting of a liquid which is preferably water, aluminium sulphate and a compound such as a carbonate, hydroxide or oxide of a divalent metal.

27 Claims, No Drawings

METHOD FOR TREATING SILICA GEL

BACKGROUND OF THE INVENTION

1. Field of the Invention

The present invention relates to a method for treating, such as stabilizing, silica gel.

2. Brief Description of the Related Art

Humidity exchange elements which are intended for use in dehumidifiers, heat exchangers or the like, are often formed from a solid adsorbent which may adsorb humidity and such moisture adsorbent is e.g. silica gel. Thus the adsorbent will alternately adsorb and desorb the humidity at adsorption and regenerating of the element, respectively.

A silica gel which is intended to be a good moisture adsorbent should have a large adsorption area. The adsorption area, quantified as a BET-surface, should be >300 $m^2/g$, generally 500–600 $m^2/g$. This means that such a gel has a large stored surface energy which makes it easily affected by so called hydrothermal aging i.e. a port and particle growth which results in less adsorption area which is to the detriment for good humidity adsorption. The hydrothermal aging is an irreversible process, which means that lost adsorption capability can not be recreated. A high-surfaced silica gel produced using precipitation of water glass together with a strong acid, e.g. sulphuric acid, and then dried gives a product, a gel, which is sensitive for hydrothermal aging. The speed at which the aging occurs, is mainly determined by the relative humidity in the surroundings, the temperature and the presence of alkaligenous substances.

A silica gel intended for adsorbing humidity repeatedly i.e. cyclic adsorbing and desorbing, means that it is exposed to two of the most important factors for achieving a successive deterioration of the adsorption characteristics. If also ions present in the gel are such that they give an elevated pH or that the surrounding atmosphere gives the material an elevated pH, this leads to that the aging goes faster.

It is earlier known that an aluminium content bound to the silica gel structure, limits the tendency for a silica gel to age. A usual method for adding aluminium, when the silica gel raw material consists of water glass, sodium or potassium silicate, means that the gelling is done in the presence of an aluminium salt, e.g. aluminium sulphate. There are also applications, such as during zeolite production, for adding sodium aluminate to water glass solution which then is allowed to gel. Both these principles of aluminizing occurs during what you could call a co-gelling process, i.e. the silica gel is formed in the presence of aluminium or aluminate ions. When the silica gel raw material consists of a silicic acid sol, an aluminized sol may be used for gelling together with drying or a strong electrolyte. In all these cases a larger or a smaller part of aluminium is obtained in the structure.

In the above mentioned method for stabilizing the gel using co-gelling of water glass in a medium containing an aluminium salt, such as aluminium sulphate, the gelling occurs during influence of a powerful change of pH in the water glass. The water glass has a pH before the gelling of approximately 12. For achieving a good humidity adsorbent, the water glass is exposed to a pH<3, preferably more acid. This means that the pH range which now appears giving the prerequisite for a good stabilization is very transitory. At pH 3 or below aluminium appears in a water solution as a 6-coordinating $Al^{3+}$ ion. This ion can not substitute silicon in the gel structure. The fast pH-change is in itself desirable for obtaining an optimal gel regarding a good humidity adsorption, on the contrary the prerequisites for a safe stabilization are treated unfairly.

In the case of mixing an aluminate, e.g. sodium aluminate, in the water glass before gelling, a slow forming of an aluminium silica gel before the real gelling in acid medium takes place. The disadvantage with this process is that after the mixing of aluminate and water glass a gelling process commences which changes the characteristics of the water glass in time and thus calls for certain requirements of the controlling of the process for achieving the desired effect. A mixture which has been standing too long before the real gel production does not receive the desired gel characteristics. Thus critical process conditions arise for obtaining the combination in a silica gel with good humidity adsorption and good stabilization.

As an example of another method, a solution of polyaluminium sulphate with a sufficient aluminium concentration and a pH in the range of 3.5–4.3 has the ability of contributing a stabilization effect, can be quoted. The presence of chloride ions is however not desirable as this requires that the gel is washed thoroughly in order not to risk that chloride ions remain which later may be set free in the form of hydrogen chloride and affect surrounding material where the gel subsequently is used.

Another example where a stabilization effect may be obtained is when pH in an aluminium sulphate solution is elevated by using an alkaline solution—sodium- or potassium hydroxide to a pH >3.6, preferably 3.8. The difficulty with this is that aluminium hydroxide readily precipitates and makes the solution without effect. Practical problems concerning this process are marked.

A third example is treating the gel with polyaluminium sulphate solution with a high aluminium content, >2% and a pH of >3.3. The best is when the solution has an aluminium content of 4%.

It is not all the same concerning which way aluminium binds to the structure for obtaining maximal stabilizing effect. E.g. aluminium may combine with the silica gel through replacing hydrogen groups on the surface of the silica gel. Aluminium is then placed in an ion-exchange position and contributes very little to a stabilizing effect, especially after a change of pH in the surface layer of the gel. It is regarded that the best position for obtaining the desired effect is when a number of silica gel atoms in the structure are fully replaced by aluminium atoms, i.e. aluminium is in a four coordinated binding structure. Studying the way in which aluminium binds in a silica gel structure calls for qualified equipment and even with that information at hand it is not clear that the stabilization is optimal as there is not today basis for transferring the structural chemistry to practical hydrothermal stability. However you may by subjecting the silica gel to given conditions and through measuring the characteristics of the silica gel before and after a treatment judge the effect of a stabilization.

A method for studying hydrothermal influence is by treating the silica gel at 70° C. during 3 hours in an ammonia alkaline aqueous solution, e.g. 1% ammonium hydrogen carbonate, and by determining before and after the treatment, the BET-surface, humidity isotherm or an equilibrium humidity ratio at a given air condition. (Method I)

Another method is by autoclaving silica gel at 5 bar pressure during a given time period, e.g. 30 hours and by using the same manner as above for determining the characteristics of the gel before and after the treatment, respectively. (Method II)

A third way may be by subjecting the gel to a warm water flow, e.g. 70° C. during a couple of days. (Method III)

All three methods give a strong hydrothermal affect on the materials and a non-stabilized gel will expose large differences of the results before and after the treatments, respectively, whereas a good stabilization gives a gel which is affected to a less degree.

OBJECT OF THE INVENTION

The main object of the present invention is to achieve a method for creating a hydrothermally stable silica gel from an already precipitated gel, which method is built upon that the conditions during the stabilization are controllable.

Another object of the present invention is to achieve a stabilization of the silica gel when it is precipitated, i.e. when the creation of a silica gel with a desired pore structure is completed and the stabilization is performed as one separate step under controlled conditions before drying of the gel.

More objects and advantages of the invention will be apparent from the following description and from the patent claims.

DESCRIPTION OF THE PREFERRED EMBODIMENT

When newly precipitated, washed and wet gel is exposed to a solution of a hydrolysed aluminium salt, a stabilization of the gel according to the present invention occurs without altering the desired adsorption capability to a measurable degree under certain circumstances.

According to the invention a newly precipitated and washed silica gel is treated in a solution produced through dissolving in a solution, preferably water, aluminium sulphate together with a carbonate, hydroxide or oxide from a divalent metal.

This solution is most easily prepared through first dissolving aluminium sulphate in water with a desired concentration. Afterwards carbonate, hydroxide or oxide of the divalent metal is added. As a divalent metal compound preferable alkaline magnesium carbonate is used, even though other compounds are thinkable, such as for example those disclosed below.

In order to achieve the desired stabilization effect the concentration of Al should be higher than 2% and the molar ratio Al/Mg must be less than 2.0. In order to facilitate the dissolving of magnesium carbonate to that concentration, the dissolution should be performed at an elevated temperature. The dissolution occurs under generation of carbon dioxide. After the dissolution a clear solution is obtained which then may be used for stabilizing of a silica gel.

In the following an example of a stabilized gel will be disclosed, which is produced according to the invention.

EXAMPLE

A substrate in the form of a thin glass fibre paper was impregnated with concentrated water glass solution, a solution of sodium silicate solution with a molar ratio of 3.25, was gelled in an acid solution at pH 1.50 during 30 minutes whereupon the sheet with its gel was washed in pure water. The substrate produced in that way with its fresh and wet gel was dipped in a solution where the solution had been prepared through first producing an aluminium sulphate solution of 4.0% with respect to Al, with a density of 1.285 and a pH of 2.72 at 21.5° C. The aluminium sulphate solution was heated to 70° C., where the pH was measured with a glass electrode to 1.35. In portions under heavy mixing, powder of magnesium carbonate was added to a concentration of magnesium which finally was 2.7%. pH had then risen to 2.6 at 70° C. whereby it subsequently was 3.6 at 25° C. The density of the solution was 1.34 at room temperature.

After the treatment in this solution during 30 minutes at 40° C., the gel was once more washed in water whereupon the sample was dried at 150° C.

After drying the material according to the invention has been tested according to the above described aging tests in comparison with (A) material which has been finalized in a pure aluminium sulphate solution and (B) a material which has been co-gelled together with aluminium sulphate as described above. The following results has then been obtained using this test.

Treatment with accelerated aging method

According to the invention:

|  | Sample before treatment | Sample after treatment | Ref. A before treatment | Ref. A after treatment | Ref. B before treatment | Ref. B after treatment |
| --- | --- | --- | --- | --- | --- | --- |
| Method I, BET-surface, m²g | 590 | 535 | 514 | 370 | 564 | 370 |
| Method I, humidity ratio, % | 29 | 27 | 24.5 | 16 | 30 | 16 |
| Method II, humidity ratio, % | 29 | 14 | 21.5 | 11 | 30 | 7 |
| Method III, weight loss, % |  | 50 |  | 56 |  | 75 |

As an alternative to mixing in alkaline magnesium carbonate also magnesium hydroxide and magnesium oxide may be used. This is however much more difficult to dissolve. Other candidates are the corresponding Ba, Ca, Cu(II), Fe(II), Mn and Zn compounds.

We claim:

1. A method for stabilizing a precipitated silica gel consisting of treating the silica gel in a solution of a liquid, aluminium sulphate and a compound of a divalent metal.

2. The method according to claim 1, wherein the compound of a divalent metal is selected from a group consisting of carbonate, hydroxide and oxide of a divalent metal.

3. The method according to claim 1, wherein the liquid is water.

4. The method according to claim 1 wherein the compound of a divalent metal is basic magnesium carbonate.

5. The method according to claim 4 wherein the liquid is water and the solution is prepared through first dissolving aluminium sulphate in the water afterwhich said compound of the divalent metal is added.

6. The method according to claim 5 wherein a concentration of aluminium in the solution is higher than 2% by weight.

7. The method according to claim 6 wherein a molar ratio of aluminium divalent metal is less than 2.0.

8. The method according to claim 7 wherein the aluminium sulphate and compound of the divalent metal are dissolved in the solution at an elevated temperature.

9. The method according to claim 2 wherein the liquid is water and the solution is prepared through first dissolving aluminium sulphate in the water afterwhich said compound of the divalent metal is added.

10. The method according to claim 9 wherein a concentration of aluminium in the solution is higher than 2% by weight.

11. The method according to claim 10 wherein a molar ratio of aluminium divalent metal is less than 2.0.

12. The method according to claim 11 wherein the aluminium sulphate and compound of the divalent metal are dissolved in the solution at an elevated temperature.

13. The method according to claim 1 wherein the liquid is water and the solution is prepared through first dissolving aluminium sulphate in the water afterwhich said compound of the divalent metal is added.

14. The method according to claim 13 wherein a concentration of aluminium in the solution is higher than 2% by weight.

15. The method according to claim 14 wherein a molar ratio of aluminium to divalent metal is less than 2.0.

16. The method according to claim 15 wherein the aluminium sulphate and compound of the divalent metal are dissolved in the solution at an elevated temperature.

17. The method according to claim 4 wherein a concentration of aluminium in the solution is higher than 2% by weight.

18. The method according to claim 2 wherein a concentration of aluminium in the solution is higher than 2% by weight.

19. The method according to claim 1 wherein a concentration of aluminium in the solution is higher than 2% by weight.

20. The method according to claim 17 wherein a molar ratio of aluminium to divalent metal is less than 2.0.

21. The method according to claim 18 wherein a molar ratio of aluminium to divalent metal is less than 2.0.

22. The method according to claim 19 wherein a molar ratio of aluminium to divalent metal is less than 2.0.

23. The method according to claim 4 wherein a molar ratio of aluminium to divalent metal is less than 2.0.

24. The method according to claim 2 wherein a molar ratio of aluminium to divalent metal is less than 2.0.

25. The method according to claim 1 wherein a molar ratio of aluminium to divalent metal is less than 2.0.

26. The method according to claim 2 wherein the aluminium sulphate and compound of the divalent metal are dissolved in the solution at an elevated temperature.

27. The method according to claim 1 wherein the aluminium sulphate and compound of the divalent metal are dissolved in the solution at an elevated temperature.

* * * * *